Patented Feb. 21, 1939

2,147,811

UNITED STATES PATENT OFFICE 2,147,811

QUATERNARY AMMONIUM SALTS

Alfred William Baldwin, and Henry Alfred Piggott, Blackley, Manchester, England, assignors to Imperial Chemical Industries Limited, a corporation of Great Britain No Drawing. Application May 5, 1937, Serial No. 140,983. In Great Britain May 13, 1936

12 Claims. (Cl. 260—290)

This invention relates to the manufacture of new quaternary ammonium salts.

According to the invention we manufacture new quaternary ammonium salts by reacting together, in presence of free pyridine or C-alkylpyridine, formaldehyde, an aliphatic alcohol and sulphur dioxide.

For the purposes of this invention the term formaldehyde includes such polymers as paraformaldehyde.

The reaction may conveniently be brought about by passing sulphur dioxide into the tertiary amine, formaldehyde and the aliphatic alcohol at moderately raised temperatures, for example, 70°–100° C. If desired, inert liquid diluents such as benzene, toluene or chloroform may be present. Where the alcohol used as starting material is insoluble or sparingly soluble in water the finish of the reaction is usefully indicated by the reaction mass becoming soluble in water. As already said the reaction is carried out in presence of free pyridine or a C-alkylpyridine such as lutidine or picoline. A technically convenient form of C-alkylpyridine is the so-called "pyridine bases" which are technical mixtures containing varying proportions of picoline, lutidine and the like together with more or less pyridine.

The aliphatic alcohols to be used as starting materials may be, for example, methyl, propyl, butyl, oleyl, dodecyl, hexadecyl (cetyl) or octadecyl alcohols. Similarly there may be used the mixture of alcohols obtained by the saponification of spermaceti. Such mixtures have as main constituent hexadecyl alcohol and may also contain oleyl alcohol where a low grade spermaceti has been used. When the term cetyl is used in this specification it will be understood that it does not necessarily refer to pure cetyl alcohol. Other alcohols, e. g., "olein" or oleyl alcohol (better to be known as octadecenol) are those obtainable by reduction of the fatty acids of natural fats and fatty oils. Likewise, the alcohols obtained by hydrogenation of coconut oil and palm oil acids are suitable starting materials for the process of the invention.

The new quaternary salts obtained according to the present invention conform to the general formula

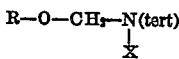

where R stands for the hydrocarbon radicle of an aliphatic alcohol, N(tert) stands for the molecule of pyridine or a C-alkylpyridine and X stands for the anion of a sulphurous acid, for example, sulphurous or pyrosulphurous acid. Because the extra valency of the sulphurous acid ion is generally neutralized by another molecule of pyridine or a C-alkylpyridine, our novel compounds may also be represented by the general formula

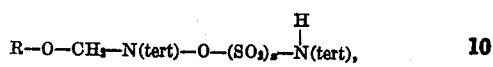

wherein R and N(tert) have the same significance as above, while $x$ stands for the numeral 1 or 2. The new quaternary salts are, in general, viscous oils or low melting solids which are sparingly soluble in acetone or ether and readily soluble in water. The aqueous solutions of those new quaternary salts derived from the higher fatty alcohols foam readily on shaking. The new quaternary salts are useful as agents in textile treatment processes. Like other quaternary compounds of the same general structure, they are useful as wetting and penetrating agents for the various aqueous treatments of textile fibers. They are also useful in the conversion of acid and direct dyestuffs into spirit soluble dyes, according to Landolt, United States Patent No. 2,053,616. They are further useful in the treatment of cellulosic fiber to render it water-repellent, for instance according to French Patent No. 814,484. Finally, they are useful as softening agents for textile fiber and as starch-fixing agents.

The invention is illustrated but not limited by the following examples in which the parts are by weight.

Example 1

30 parts of cetyl alcohol, 12 parts of paraformaldehyde and 120 parts of pyridine are heated together at 90–100° C. under a reflux condenser. Gaseous sulphur dioxide is passed into the heated mixture until a test sample from the mixture dissolves readily in water to give a clear solution. This is after approximately 5–10 minutes. Pyridine and paraformaldehyde are evaporated off from the reaction mixture by heating at 60°–70° C. under reduced pressure. The new quaternary salt which is left as a pale-coloured viscous residue may be further purified to give a sticky solid by washing with acetone. The new quaternary salt is readily soluble in water to give clear, foaming solutions.

Analysis indicates that the new quaternary salt is a mixture of cetyloxymethylpyridinium pyridine sulphite of the formula

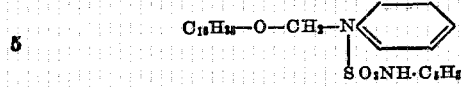

and cetyloxymethylpyridinium pyridine pyrosulphite of the formula

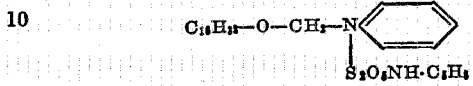

Example 2

8 parts of paraformaldehyde, 3.2 parts of methanol and 64 parts of pyridine are heated to 80° C. and then external heating is discontinued. Gaseous sulphur dioxide is passed in at such a rate that the temperature of the reaction mixture is maintained at 80°–90° C. without the application of external heating. When the passing of sulphur dioxide gas is no longer capable of maintaining the reaction mixture at 80° C. the stream of gas is stopped and the reaction mixture cooled to atmospheric temperature. The cooled reaction mixture separates into two layers. The lower oily layer is removed, washed first with acetone and then with ether and finally dried in vacuo at 30° C. The new quaternary salt thus obtained in the form of a slightly pink-coloured oil is soluble in water but insoluble in acetone or pyridine. Analysis of the oil indicates that it is a mixture of methyloxymethylpyridinium pyridine sulphite and methyloxymethylpyridinium pyridine pyrosulphite of the formula

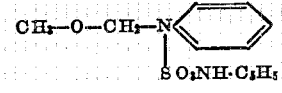

and

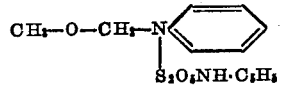

respectively.

Example 3

8 parts of paraformaldehyde, 8 parts of butyl alcohol and 64 parts of pyridine are reacted with sulphur dioxide in the manner described in Example 2. The reaction mixture is then cooled to atmospheric temperature and diluted with acetone. The lower oily layer which separates is removed, washed first with acetone and then with ether and finally dried in vacuo at 30° C. The new quaternary salt is thus obtained as a colourless viscous oil (16.2 parts) which is very soluble in water but which is insoluble in acetone or ether. The new quaternary salt is a mixture of butyloxymethylpyridinium pyridine pyrosulphite and butyloxymethylpyridinium pyridine sulphite.

Example 4

8 parts of paraformaldehyde, 18.6 parts of dodecyl alcohol and 64 parts of pyridine are stirred together and a rapid stream of gaseous sulphur dioxide is passed in until the temperature of the reaction mixture rises to 75° C. The stream of gas is then stopped. The stirred mixture eventually rises to a temperature of 88° C. when a sample of the reaction mixture is readily soluble in cold water to a clear foaming solution. Stirring is continued for several hours when the reaction mixture cools to atmospheric temperature and white crystals separate out. The crystals are filtered off and purified by recrystallization from acetone. The new quaternary salt thus obtained is readily soluble in water to give clear, foaming solutions and analysis indicates that it is a mixture of dodecyloxymethylpyridinium pyridine sulphite of formula

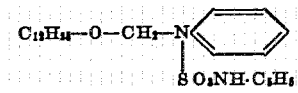

and dodecyloxymethylpyridinium pyridine pyrosulphite of formula

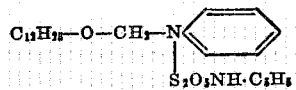

We claim:

1. Process for the manufacture of quaternary ammonium salts which comprises reacting together formaldehyde, an aliphatic alcohol and sulphur dioxide, in the presence of a tertiary base selected from the group consisting of pyridine and its homologs.

2. Process for the manufacture of quaternary ammonium salts which comprises reacting together paraformaldehyde, an aliphatic alcohol of at least 10 carbon atoms and sulphur dioxide, in the presence of a tertiary base selected from the group consisting of pyridine and its homologs.

3. Process which comprises passing sulphur dioxide into a mixture of paraformaldehyde, pyridine and an aliphatic alcohol of at least 10 carbon atoms until a water-soluble reaction product is obtained.

4. Quaternary salts of the general formula

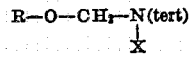

where R stands for the hydrocarbon radicle of an aliphatic alcohol, N(tert) stands for the molecule of a tertiary base selected from the group consisting of pyridine and its homologs, and X stands for the anion of a sulphurous acid the extra acid valency of which is neutralized by a tertiary base of the aforesaid group.

5. Quaternary salts of the general formula

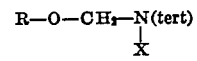

where R stands for an aliphatic hydrocarbon radicle of at least 10 carbon atoms, N(tert) stands for the molecule of a tertiary base selected from the group consisting of pyridine and its homologs, and X stands for the anion of a sulphurous acid the extra acid valency of which is neutralized by a tertiary base of the aforesaid group.

6. Quaternary salts of the formula

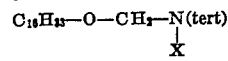

where N(tert) stands for the molecule of a tertiary base selected from the group consisting of pyridine and its homologs, and X stands for the anion of a sulphurous acid the extra acid valency of which is neutralized by a tertiary base of the aforesaid group.

7. Cetyloxymethylpyridinium salts of the formula

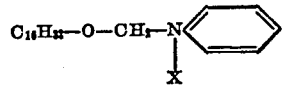

where X is the anion of a sulphurous acid the extra acid valency of which is neutralised by a molecule of pyridine.

8. A new composition comprising a mixture of cetyloxymethylpyridinium pyridine sulphite of the formula

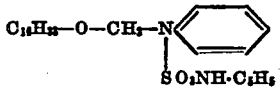

and cetyloxymethylpyridinium pyridine pyrosulphite of the formula

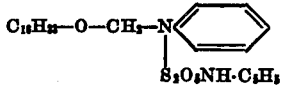

wherein the group $NC_5H_5$ represents the pyridine ring.

9. A compound of the general formula

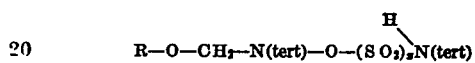

wherein R stands for the hydrocarbon radical of an aliphatic alcohol, N(tert) stands for the molecule of a tertiary base selected from the group consisting of pyridine and its homologs, while $x$ stands for the numeral 1 or 2.

10. A compound of the general formula

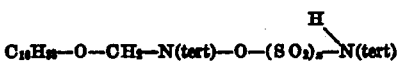

wherein N(tert) stands for the molecule of a tertiary base selected from the group consisting of pyridine and its homologs, while $x$ stands for the numeral 1 or 2.

11. A compound of the general formula

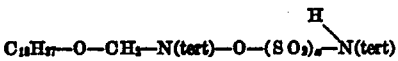

wherein N(tert) stands for the molecule of a tertiary base selected from the group consisting of pyridine and its homologs, while $x$ stands for the numeral 1 or 2.

12. A compound of the general formula

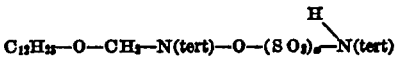

wherein N(tert) stands for the molecule of a tertiary base selected from the group consisting of pyridine and its homologs, while $x$ stands for the numeral 1 or 2.

ALFRED WILLIAM BALDWIN.
HENRY ALFRED PIGGOTT.